United States Patent [19]
Rohan

[11] 3,857,350
[45] Dec. 31, 1974

[54] FUEL VENT TANK

[76] Inventor: James E. Rohan, 3101 N.E. 47th Ct., Fort Lauderdale, Fla. 33308

[22] Filed: Feb. 13, 1974

[21] Appl. No.: 442,042

Related U.S. Application Data

[63] Continuation of Ser. No. 328,326, Jan. 31, 1973, abandoned.

[52] U.S. Cl............... 114/.5 R, 116/112, 137/344, 137/554, 137/557, 137/558, 137/572
[51] Int. Cl... B63b 17/00, F16k 37/00, G01p 13/00
[58] Field of Search.................. 116/70, 112, 117 R; 114/.5 R; 123/41.54; 137/344, 551, 554, 557, 558, 571, 572

[56] References Cited
UNITED STATES PATENTS

| | | | |
|---|---|---|---|
| 482,171 | 9/1892 | Guasco et al. | 137/557 X |
| 1,667,128 | 4/1928 | Mettler | 116/117 R |
| 2,227,323 | 12/1940 | Scully et al. | 137/558 |
| 3,083,701 | 4/1963 | Peras | 123/41.54 |
| 3,154,049 | 10/1964 | Smith et al. | 116/70 |
| 3,326,087 | 6/1967 | Gohlke et al. | 137/554 X |
| 3,520,329 | 7/1970 | Weber | 137/571 |
| 3,610,220 | 10/1971 | Yamada et al. | 137/571 X |
| 3,719,203 | 3/1973 | Wettre | 137/554 |

FOREIGN PATENTS OR APPLICATIONS

| | | | |
|---|---|---|---|
| 142,725 | 5/1920 | Great Britain | 116/117 R |
| 424,589 | 1/1926 | Germany | 116/117 R |
| 687,766 | 1/1940 | Germany | 116/117 R |

Primary Examiner—Alan Cohan
Assistant Examiner—Gerald A. Michalsky
Attorney, Agent, or Firm—Malin & Haley

[57] ABSTRACT

A fuel vent sump tank to prevent overboard spillage of fuel on marine craft comprising a sump tank connected to the fuel tank vent line, the vent line having a fuel flow alarm which informs an operator that fuel is being received into the vent line, the excess fuel being collected in the overboard vent sump tank. The collected fuel in the sump tank may be returned to the fuel tank. This system prevents accidental spillage or dumping of fuel overboard during the filling of the fuel tank or tanks.

2 Claims, 4 Drawing Figures

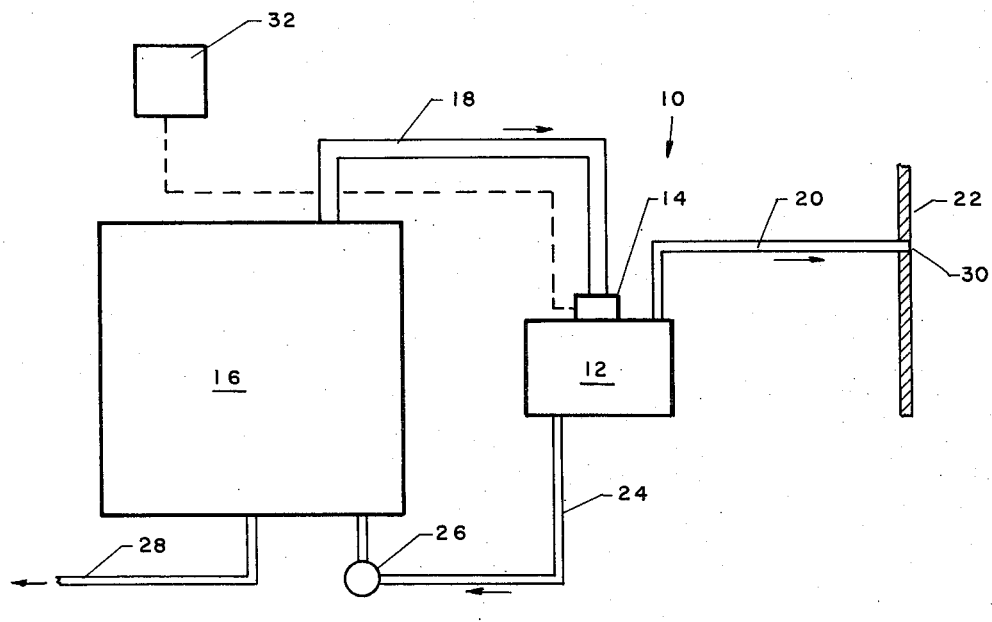
FIG. I
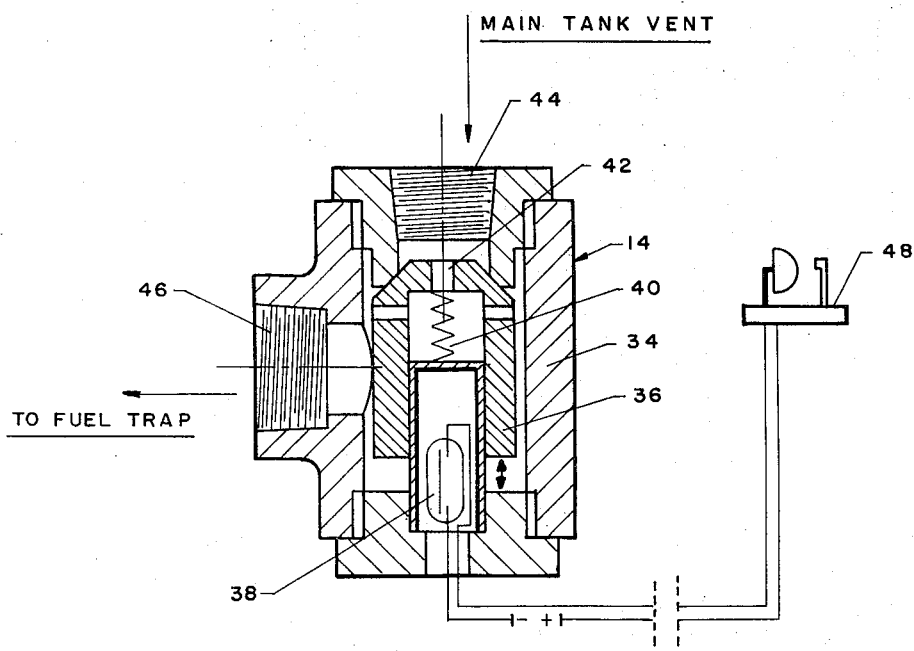
FIG. 2

FUEL VENT TANK

This is a continuation of application Ser. No. 328,326, filed Jan. 31, 1973 now abandoned.

BACKGROUND OF THE INVENTION

This invention relates generally to a fuel tank system, and, specifically, to a vented sump tank to prevent overboard spillage of fuel on a marine vessel.

In the past, fuel tanks, especially on marine vessels, were filled until the vent line discharged fuel overboard which signalled that the tank was full. This procedure has created a pollution problem because of the spillage and dumpage of fuel into the water through the overboard vent. Applicant's device overcomes this problem by providing a sump tank which collects fuel dumped into the vent line. An alarm device between the fuel tank and the vent sump tank indicates the flow of fuel through the vent line being discharged into the sump tank. The sump tank, itself, is then vented overboard to provide proper venting to the fuel tank. The sump tank is also connected back to the fuel tank so that collected fuel may be pumped back to the fuel tank.

BRIEF DESCRIPTION OF THE INVENTION

A liquid storage and venting system comprising a fuel tank, a fuel tank vent line coupled into the fuel tank, a vent line sump tank coupled to the vent line, fuel flow alarm means coupled to the vent line between said fuel tank and said vent sump tank, and an overboard vent line coupled to said vent sump tank. A return line and a pumping means may be added between the vent sump tank back to the main fuel tank. The overboard vent line is coupled through the hull of the marine vessel, or the like, but may be utilized at any type of vehicle utilizing a fuel system. The fuel flow alarm means is connected to an indicating device which will notify an operator filling the fuel tank that the tank is full and that fuel has begun to flow into the overboard vent line. The fuel tank is effectively vented overboard through the sump tank vent line. The fuel flow alarm means is constructed to allow the free flow of air from the fuel tank into the sump tank and can only be acutated by the positive flow of liquid fuel. This insures that the tank is vented properly at all times. The excess fuel will be collected in the vent sump tank and upon reaching a certain level may be pumped back into the fuel tank.

It is an object of this invention to provide a spillage alarm for a fuel vent line which prevents pumping of fuel overboard on marine vehicles.

It is another object of this invention to provide a fuel storage and venting system which will eliminate spillage but allows for the continual venting of the fuel tank.

And still yet another object of this invention is to provide a fuel spillage alarm which allows the venting of air but indicates the flow of liquid through a line.

And yet still another object of this invention is to provide an anti-pollution device to eliminate spillage of raw fuel into a lake or ocean by preventing fuel from being pumped overboard through the venting system from expansion, transferring, or filling the fuel tanks.

In accordance with these and other objects which will be apparent hereinafter, the instant invention will now be described with particular reference to the accompanying drawings.

BRIEF DESCRIPTION OF THE DRAWINGS

FIG. 1 shows a schematic drawing of Applicant's fuel vent alarm system.

FIG. 2 shows a cross-sectional view in elevation of Applicant's fuel flow alarm device.

PREFERRED EMBODIMENT OF THE INVENTION

Figure 3:
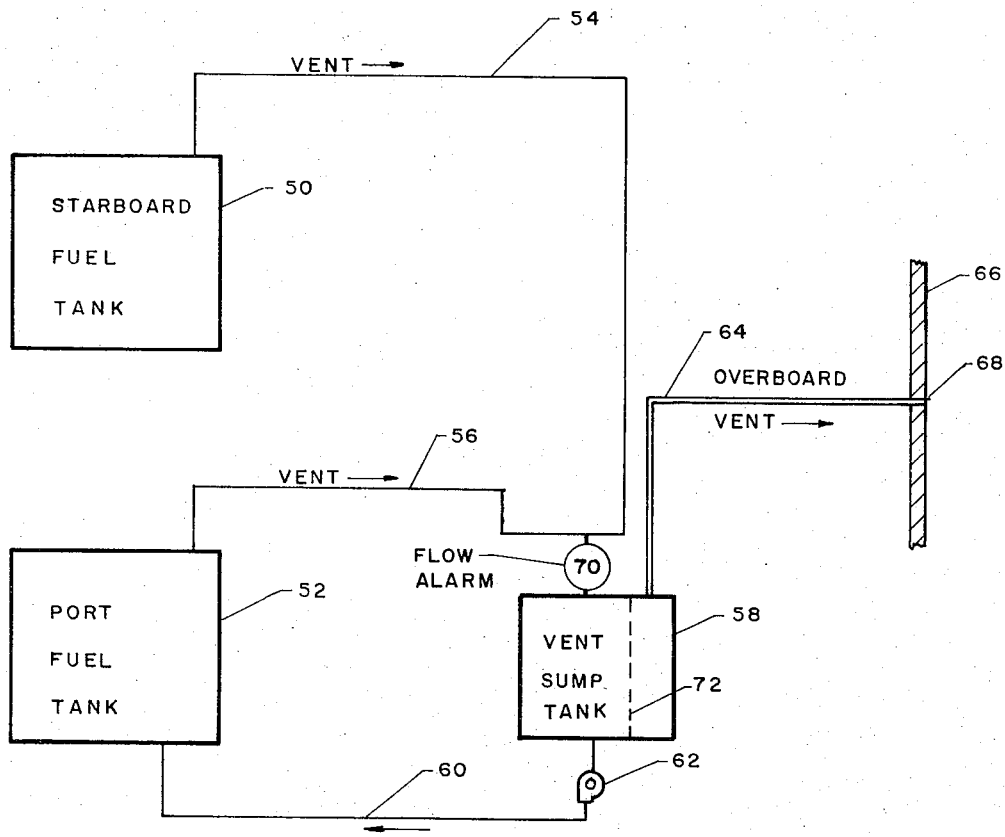
FIG. 3 shows an alternate embodiment schematically of Applicant's invention utilized in a dual fuel tank system.

Referring now to the drawings and in particular to FIG. 1, Applicant's fuel venting system is shown, generally at 10, comprising a main fuel tank 16 having a vent line 18 which vents into the vent sump tank 12 through a fuel flow alarm means 14 coupled between the main fuel tank 16 and the sump tank 12. The sump tank 12 is vented overboard by vent line 20 through hull structure 22 having a vent overboard opening 30. The fuel flow alarm also has a display or sounding device 32 electrically coupled to the alarm means.

The fuel tank 16 has a fuel filling line 28 which is connected to some point on the vessel (not shown) terminating in a fuel line cap.

The vent sump tank 12 has a return line 24 connected back to the fuel tank 16, the fuel line 24 having a pump 26 disposed along the line to pump the returned fuel into the tank upon command.

In operation, fuel tank 16 is filled. Upon reaching a state of fullness, excess fuel will be forced into the vent line 18 until it flows through the fuel flow alarm means 14, and is collected within the vent sump tank 12. Any liquid fuel flow passing through the fuel flow alarm means 14 will sound an alarm or cause a display upon indicating means 32 to warn the operator that the fuel tank 16 is filled and that fuel is dumping into the vent tank 12. The excess fuel collected in the vent tank 12 will then be pumped back (or drained by gravity) into the fuel tank 16. The vent line 20 from the sump tank 12 leading overboard of the vessel still provides proper venting for the fuel tank 16, there being a ventilation through the vent line 18, the fuel flow alarm means 14 and the vent line 20. A baffle (not shown) is provided within the sump tank 12 to insure that fuel does not bubble out through the overboard vent line 20, but is condensed and remains within the fuel vent tank 12.

The fuel flow alarm is shown in FIG. 2 comprised of a chamber having a housing 34 within which is contained a magnetic plug 36 that is seated within the main tank incoming line 44 and is resiliently held in position by spring 40. A reed switch 38 is positioned within a housing coupled to spring 40. A plurality of channels 42 exist through the magnetic plug 36 which allow air to vent through the device and back to the vent tank through conduit 46 without depressing the magnetic plug. The reed switch 38 is electrically coupled an alarm 48.

In operation, liquid fuel entering through conduit 44 from the main fuel tank vent will depress magnetic plug 36 opening the flow chamber to allow the fuel to flow into conduit 46 and into the vent sump tank. When the plug is forced against spring tension 40, the magnetic field causes the reed switch 38 to complete contact, closing the circuit with bell 48. Thus, the alarm bell will ring when the plug is depressed signaling a liquid fuel flow through the alarm.

FIG. 3 shows Applicant's device applied to a dual fuel tank system in which the vent lines 54 and 56, coupled respectfully to the starbard fuel tank 50 and the port fuel tank 52, are coupled across liquid flow alarm 70 in a common line. The alarm 70 is coupled into the vent sump tank 58, as shown previously. A return line 60 from the vent tank 58 allows fuel that is collected in the vent sump tank to be returned back into the port fuel tank by pump 62. The vent sump tank has an overboard vent 64 coupled through the hull of the vessel 66, with an overboard opening 68. Baffle 72 prevents frothing of fuel overboard.

Figure 4:
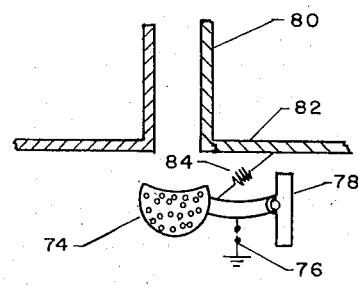
FIG. 4 shows an alternate embodiment of Applicant's fuel flow alarm utilized within the vent sump tank.

It is understood that the flow alarm can be placed anywhere between the main fuel tank along the vent line or could be housed within the vent sump tank as shown in an alternate embodiment in FIG. 4. The main fuel tank vent line 80 opens into the vent sump tank housing 82. A fuel receiving cup 74 is positioned adjacent the mouth of the main fuel vent line 80. The fuel cup 74 is pivotally coupled to a supporting means 78 which may be coupled to the wall of the tank. A spring 84 holds the cup in a level position, but is tensioned so that fuel flowing through the main vent line 80 will be trapped within the fuel cup 74 increasing the weight of the cup causing the cup to be pushed downward allowing contact 76 to be engaged completing a circuit (not shown) which is connected to an alarm, as discussed previously. The fuel would then leak through holes positioned in the fuel cup 74 and allow the fuel to be collected within the vent sump tank turning off the alarm. In this embodiment the alarm may then be positioned with the vent sump tank itself and need not be positioned within the main fuel tank vent line.

Additional features may be added to the vent tank, such as a visible level gage. An automatic pumping feature may be added to the vent sump tank which provides that at a certain fuel level in the vent sump tank, the pump will automatically pump the fuel collected back into the main fuel tank.

Thus, Applicant has provided a non-complex system and vent sump tank that will prevent accidental or unintentional spillages of fuel from being pumped overboard while still retaining the venting necessary for utilization of the fuel tank. With the use of Applicant's invention, the fuel tanks may be filled without danger of the excess fuel being pumped into the water or adjacent area.

Applicant's invention also prevents overboard spillage of fuel through the fuel vent line from a full fuel tank resulting from expansion of fuel transferred from a storage area into the vessel tanks which are normally at ambient temperature or above.

Applicant's invention may be utilized when transferring fuel internally of a vessel from one tank to another to provide an indication of when a tank is full and to prevent overboard dumping.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. In a marine vessel having a hull and a fuel storage tank, the improvement comprising:
   fuel filling access means connected to said fuel storage tank;
   fuel vent sump tank;
   fuel storage tank overflow conduit connected in liquid flow communication at one end to said fuel storage tank which receives fuel when said fuel storage tank is filled beyond capacity and at its opposite end to said fuel vent sump tank;
   an overboard fluid pressure vent line connected at one end to said sump tank and at its opposite end through said vessel hull, venting to the outside atmosphere;
   liquid flow sensing means connected in fluid communication with said fuel storage tank overflow conduit for sensing a flow of liquid in said overflow conduit; and
   liquid flow indicating alarm means connected to and initiated by said flow sensing means for indicating liquid flow within said fuel storage tank overflow conduit to a human being.

2. The device in claim 1, including:
   liquid return line connected in liquid flow communication between said sump tank and said fuel storage tank.

* * * * *